United States Patent [19]

Moradi-Araghi

[11] Patent Number: 5,358,043
[45] Date of Patent: Oct. 25, 1994

[54] GELLING COMPOSITIONS USEFUL FOR OIL FIELD APPLICATIONS

[75] Inventor: Ahmad Moradi-Araghi, Bartlesville, Okla.

[73] Assignee: Phillips Petroleum Company, Bartlesville, Okla.

[21] Appl. No.: 34,977

[22] Filed: Mar. 22, 1993

[51] Int. Cl.$^5$ .............. E21B 33/13; E21B 33/138; E21B 43/22; E21B 43/26
[52] U.S. Cl. ............................ 166/270; 166/295; 166/300; 166/308; 252/8.551; 523/130
[58] Field of Search .............. 166/270, 294, 295, 300, 166/305.1, 308; 252/8.551, 8.554; 523/130

[56] References Cited

U.S. PATENT DOCUMENTS

| | | | |
|---|---|---|---|
| 3,633,689 | 1/1972 | Christman | 166/901 X |
| 4,018,286 | 4/1977 | Gall et al. | 166/295 |
| 5,065,822 | 11/1991 | Miller et al. | 166/295 |
| 5,067,564 | 11/1991 | Sydansk | 166/270 |
| 5,077,314 | 12/1991 | Phillips et al. | 514/640 |

*Primary Examiner*—George A. Suchfield
*Attorney, Agent, or Firm*—Lucas K. Shay

[57] ABSTRACT

A gelling composition and a process for wellbore treatment comprising injecting the composition into reservoirs are disclosed wherein the composition comprise a water-soluble polymer such as, for example, polyacrylamide; an iron compound such as, for example, ferric acetylacetonate or ammonium ferric oxalate; a ketone compound such as, for example, 2,4-pentanedione; and a liquid such as, for example, a produced brine.

26 Claims, No Drawings

5,358,043

GELLING COMPOSITIONS USEFUL FOR OIL FIELD APPLICATIONS

FIELD OF THE INVENTION

The present invention relates to a gelling composition and application thereof in oil field operations.

BACKGROUND OF THE INVENTION

It is well known to those skilled in the art that gelled or crosslinked water-soluble polymers are useful in enhanced oil recovery and other oil field operations, They have been used to alter the permeability of underground formations in order to enhance the effectiveness of water flooding operations, Generally, polymers along with an appropriate crosslinking system are injected in an aqueous solution into the formation, The polymers then permeate into and gel in the regions having the highest water permeability.

Because of environmental concerns as well as cost for disposing of a produced brine which is defined as the brine co-produced with oil and gas, it is desirable to utilize the produced brine as the aqueous solution used for the polymers and appropriate crosslinking system described above, Use of produced brines eliminates not only the cost associated with acquiring and pre-treating fresh water for use as the aqueous solution but also the disposal cost for the produced brine. Most produced brines are known to be hard brines, i.e., those having a salinity of greater than 2% total dissolved solids, basically inorganic salts. Chromium(III) carboxylates such as, for example, chromium acetate are the only known crosslinkers which can be used to produce stable gels in produced brines for near-wellbore treatment. See for example R. D. Sydansk, *Acrylamide-Polymer/-Chromum(III)-carboxylate Gels for Near Wellbore Matrix Treatments*, Proceedings SPE/DOE Seventh Symposium on Enhanced Oil Recovery (1990). Although a chromium(III) salt is not as toxic as a chromium(VI) salt, it is not an environmentally desirable compound and its use may require additional costs to assure the integrity of the injection wells to avoid contamination of ground water sources.

Furthermore, most gelling compositions form permanent gels, i.e., gels that are stable for longer than about 360 days. For many oil field applications, permanent gels are undesirable. For example, in formations where there are a lot of casing failure due to subsidence, gelling compositions are injected between tubing and casing to block water leakage into the well. If permanent gels were formed between the tubing and casing, it could be very difficult to remove the tubing when needed. Temporary gels which disappear by themselves in the formation in less than about 180 days would seem very desirable for this type of application.

For selective stimulations, a very high viscosity gel may be placed in the casing across a lower open interval while fracturing an upper interval. Currently sand is placed in the casing in the lower interval to allow selective stimulation of the upper interval. Use of a temporary gel instead of sand eliminates the need for sand cleanout after the stimulation. Temporary gels can also be placed in high permeability channels before injecting the fracturing fluids. After the gels are set, the fracturing fluids can be injected which will go into the lower permeability zones and fracture them. This will result in better stimulation.

An additional example of using temporary gels is the use of these gels in workover of gas wells. A temporary gel can be placed in the gas producing zone to protect it against formation damage caused by completion fluids.

Additionally, temporary gels can be placed in high permeability channels before injecting acid which would help to clean up the lower permeability zones. Temporary gels can also be used as "Gel Pig" for cleaning the pipelines. The advantage of temporary gels over permanent gels is that if the gels are designed properly to break down at the end of cleaning process, it would be easier to handle the decomposition product which is liquid as compared to solid gels.

Thus, it would be a significant contribution to the art if a composition that forms a temporary gel in subterranean formations can be developed.

SUMMARY OF THE INVENTION

An object of the invention is to provide a gelling composition comprising produced brines having a high salinity. Another object of the invention is to provide a gelling composition that is environmentally suitable for use in oil field operations. A further object of the invention is to provide a gelling composition that delays gelation process so that all components of the gelling compositions can be injected simultaneously. Still a further object of the invention is to provide a composition that forms a temporary gel useful for temporary blockage in oil field applications. An advantage of the invention is the delayed gelation of the composition so that, for near-wellbore treatment, the components of the composition can be simultaneously injected. Another advantage of the invention is the use of high salinity produced brines to eliminate the necessity of treating or disposing of the brines. Still another advantage of the invention is the formation of temporary gels that disappear within about 180 days. Other objects, features, and advantages will become more apparent as the invention is more fully disclosed hereinbelow.

According to an embodiment of the invention, a composition is provided which comprises a water-soluble polymer, an iron compound, a ketone compound, and a liquid.

According to another embodiment of the invention, a process for wellbore treatment in an oil field operation is provided which comprises injecting a water-soluble polymer, an iron compound, a ketone compound, and a liquid into an injection or producing well.

DETAILED DESCRIPTION OF THE INVENTION

According to the first embodiment of the invention, a composition that is useful for wellbore treatment in oil field operations comprises a water-soluble polymer, an iron compound, a ketone compound, and optionally a produced brine. The wellbore treatment includes, but is not limited to, water shutoff, gas shutoff, zone abandonment, fracture treatment, formation profile modification, workover of gas wells, selective stimulation, and other temporary blockage in oil field applications.

Polymers suitable for use in this invention, i.e., those capable of gelling in the presence of the iron compound within a gelation pH range, include biopolysaccharides, cellulose ethers, and acrylamide-based polymers.

Suitable cellulose ethers are disclosed in U.S. Pat. No. 3,727,688 (herein incorporated by reference). Particularly preferred cellulose ethers include carboxymethylhydroxyethyl cellulose (CMHEC) and caroboxymethyl cellulose (CMC).

Suitable biopolysaccharides are disclosed in U.S. Pat. No. 4,068,714 (herein incorporated by reference). Particularly preferred is polysaccharide B-1459 and xanthan gums which are biopolysaccharides produced by the action of *Xanthomonas campestris* bacteria. This biopolysaccharide is commercially available in various grades under the tradename "KELZAN®" (Kelco Company, Los Angeles, Calif.) and "FLOCON 4800" (Pfizer, Groton, Conn.).

Suitable acrylamide-containing polymers which also contain small amounts of pendant carboxylate (acrylate) groups are disclosed in U.S. Pat. No. 3,749,172 (herein incorporated by reference). As used herein, the term "small amounts" refers to about 0.5 to 10 mole percent. Particularly preferred are the so-called partially hydrolyzed polyacrylamides possessing pendant carboxylate groups through which crosslinking can take place. Thermally stable polymers of acrylamide, such as copolymers of N-vinyl-2-pyrrolidone and acrylamide, terpolymers of sodium-2-acrylamido-2-methylpropanesulfonate, acrylamide and N-vinyl-2-pyrrolidone, and copolymers of sodium-2-acrylamido-2-methyl-2-propanesulfonate and acrylamide, are particular preferred for applications in high salinity environments at elevated temperatures. Selected terpolymers also are useful in the present process, such as terpolymers derived from acrylamide and N-vinyl-2-pyrrolidone comonomers with lesser amounts of termonomers such as vinyl acetate, vinylpyridine, styrene, methyl methacrylate, and other polymers containing acrylate groups.

Other miscellaneous polymers suitable for use in the present invention include partially hydrolyzed polyacrylonitrile, lignosulfonates, and mistures thereof.

Presently preferred are CMC, xanthan gum, and the acrylamide based polymers, particularly the partially hydrolyzed polyacrylamides, polymers containing acrylamide, ammonium or alkali salt of acrylic acid, and polymers containing ammonium or alkali salt of acrylic acid, N-vinyl-2-pyrrolidone, and sodium-2-acrylamido-2-methylpropanesulfonate.

The iron compound useful in the invention is an iron-(III) compound or an iron(II) compound in the presence of an oxidizing agent wherein iron(II) can be oxidized to an iron(III) compound. The iron compound can be an organic or inorganic iron compound. Examples of suitable iron compounds include, but are not limited to, ferric acetylacetonate, ammonium ferric oxalate, ferric sulfate, ferric citrate, and mixtures thereof. Presently, ferric acetylacetonate and ammonium ferric oxalate are the preferred iron compound.

Examples of iron(II) compounds useful in the present invention include, but are not limited to, a ferrous halide, ferrous sulfate, ferrous acetylacetonate, ferrous citrate, and mixtures thereof. Many oxidizing agents can be used to convert these iron(II) compounds to their corresponding iron(Ill) compounds. Examples of suitable oxidizing agents include, but are not limited to ammonium persulfate, sodium persulfate, potassium persulfate, sodium nitrate, sodium perchlorate, sodium hypochlorite, and mixtures thereof.

According to the first embodiment of the invention, a ketone compound is included in the composition of the invention to delay the gelation rate so that the components of the composition can be simultaneously injected without plugging up the injection well. Examples of the ketone compound include, but are not limited to, 2,4-pentanedione, 2,3-pentanedione, and mixtures thereof. The presently preferred ketone compound is 2,4-pentanedione because of its low cost.

The liquid component of the composition can be water, a solution containing dissolved solids, as a suspension containing some undissolved solids. The presently preferred liquid is a produced brine. The produced brine that can be employed in the composition of the invention is defined as the brine co-produced with oil or gas, or both, which generally is a hard brine, i.e., containing at least 1,000 ppm of $Ca^{+2}$, $Ba^{+2}$, $Mg^{+2}$, or $Sr^{+2}$, or combinations thereof. It generally contains high salinity of from about 1% to about 30% total dissolved solids. The composition of the invention also gels well in produced brines having a salinity of from about 3% to about 27%. To delay the rate of gelation so that the components of the composition can be injected at the same time without plugging up the injection or producing wells, a produced brine having a salinity of from 4% to 25% generally produces better results.

The composition of the invention can be prepared by mixing the individual components together employing conventionally well-known mixing means. The order of adding individual components does not change the characteristics of the composition.

The concentration or amount of the water-soluble polymer in the aqueous solution can range widely and be as suitable and convenient for the various polymers, and for the degree of gelation needed for particular reservoirs. Generally, the concentration of polymer in its aqueous solution is made up to a convenient strength of about 100 to 30,000 ppm, preferably about 200 to 10,000 ppm.

Any suitable procedures for preparing the aqueous admixtures of the water-soluble polymer can be used. Some of the polymers may require particular mixing conditions, such as slow addition of finely powdered polymer into the vortex of water or stirred produced brine, alcohol prewetting, protection from air (oxygen), preparation of stock solutions from fresh rather than salt water, or the like, as is known for such polymers.

The concentration of the iron compound in the composition depends largely on the concentrations of polymer in the composition. Lower concentrations of polymer, e.g., require lower concentrations of the iron compound. Further, it has been found that for a given concentration of polymer, increasing the concentration of iron compound generally substantially increases the rate of gelation. The concentration of iron compound in the injected slug varies generally over the broad range of 25 ppm to 15,000 ppm, preferably over the range of 100 ppm to 7,000 ppm based on ferric concentration in the liquid component.

The concentration of the ketone compound in the composition also depends on the concentrations of the water-soluble polymer in the composition and on the desired rate of gelation. Generally, the faster the gelation rate, the lower concentration of the ketone compound is required. Also generally, the concentration of the ketone compound varies broadly in the range of about 25 ppm to about 5,000 ppm, preferably in the range of about 50 ppm to about 3,000 ppm, and most preferably in the range of 100 ppm to 2,000 ppm in the liquid.

According to the second embodiment of the invention, a process for wellbore treatment in an oil field operation comprises simultaneously injecting a water-soluble polymer, an iron compound, ketone compound, and a liquid into an injection well. The definition and scope of the water-soluble polymer, iron compound, ketone, compound and liquid are the same as those described in the first embodiment of the invention. The water-soluble polymer, iron compound, ketone compound, and liquid can also be injected sequentially without special order of injection, as long as they are first dissolved in the liquid. In order to delay the gelation, however, it is preferred that the iron compound and ketone compound be mixed together in the liquid prior to injecting.

The use of gelled polymers to alter the water permeability of underground formations is well known to those skilled in the art. Generally, an aqueous solution containing the polymer and an iron compound is pumped into the formation so that it can diffuse into the more water swept portions of the formation and alter water permeability by gelling therein.

The present invention can be used in a similar manner. An aqueous solution of the composition of the present invention can be pumped into the formation so that it alters the water permeability of the formation in a similar manner when gelation takes place. The aqueous solution, a water soluble polymer, an iron compound, and a ketone compound can be pumped into the formation in one slug, or alternatively the components may be sequentially injected in a manner to provide an appropriate concentration in the formation.

The nature of the underground formation treated is not critical to the practice of the present invention. The described gelable composition can be injected into a formation having a temperature range of from about 70° F. to about 300° F., preferably from about 150° F. to about 250° F., when the polymer used is a copolymer having the repeating units derived from at least one monomer selected from the group consisting of N-vinyl-2-pyrrolidone, sodium-2-acrylamido-2-methylpropane sulfonate, acrylamide, an alkali salt of acrylic acid and combinations thereof; or a temperature in the range of from about 70° F. to about 200° F. for partially hydrolyzed polyacrylamide, xanthan gum, CMC, or CMHEC, preferably about 80° F. to about 180° F., and most preferably 90° F. to 170° F.

Examples provided hereinbelow are intended to assist one skilled in the art to further understand the invention and should not be considered limitative.

EXAMPLE I

The purpose of this example is to illustrate the formation of temporary gels from a composition comprising a water-soluble polymer, an iron compound, and a brine, and to use this example as a control.

Polyacrylamide solutions (5,000 ppm) were prepared by mixing sufficient amount of the polymer in a produced brine having 5% total dissolved solids (TDS). Then 20 ml samples of each polymer solution were placed in six vials. Each vial was charged with ferric acetylacetonate (to a final concentration as noted in Table I). The vials were placed upright in test tube racks and then placed in ovens heated to and held at 120° F. Periodically, the ampules were removed from the oven and the mechanical strength of the gels was determined.

As crosslinking developed, small microgels of granules began to appear, i.e., a very slight gel formed. Continued growth of the microgels to globule occurred next, referred to as slight gel. Larger gel masses next appeared, referred to as partial gel, followed by the development of stronger gels with measurable tongue lengths. The tongue lengths were measured by placing each vial horizontally allowing the hot gelling composition to flow to its equilibrium position and then measuring the length of the tongue formed. As gelation progressed with time, stronger gels and shorter tongue lengths were developed. The gel strength is expressed mathematically as Percent Gel Strength $= (AL - TL) \times 100/AL$ where AL equals ampule length (in centimeters), and TL equals the tongue length of the gel measured in centimeters from the point at which the gel contacts the entire circumference of the tube to the farthest point to which the gel has spread. Thus the strongest gels would have a gel strength of 100% and the weakest gels would have a gel strength of 0. The tongue length measurement results are shown in Table I.

TABLE I

| | Gelation of "OFXC-1163"[a] Polyacrylamide in TB-41 Brine[b] with Ferric Acetylacetonate at 120° F. | | | | | |
|---|---|---|---|---|---|---|
| Aging Time (Days) | Ferric Ion Concentration (ppm) | | | | | |
| | 1000 | 2000 | 3000 | 4000 | 5000 | 7000 |
| 0.00 | NG | NG | NG | NG | NG | NG |
| 0.04 | VSG–SG | VSG–SG | SG | SG | 8.2 | 6.9 |
| 0.08 | S–PG | S–PG | 8.7 | 7.0 | 5.5 | 6.5 |
| 0.13 | S–PG | S–PG | 9.0 | 6.1 | 5.2 | 4.7 |
| 0.86 | S–PG | S–PG | 9.3 | 6.7 | 3.6 | 5.0 |
| 11.1 | VSG–SG | VSG–SG | S–PG | PG | 4.3 | 6.0 |
| 18.2 | NG | NG | S–PG | S–PG | PG | 6.9 |
| 32 | NG | NG | VSG–SG | S–PG | PG | 8.2 |
| 48 | THIN | THIN | THIN | VSG–SG | S–PG | PG |
| 82 | THIN | THIN | THIN | THIN | THIN | VSG |

NG = No Gel, SG = Slight Gel, VSG–SG = Very Slight Gel to Slight Gel, S–PG = Slight to Partial Gel, VSG — Very Slight Gel.
[a]"FXC-1163" is a low hydrolysis polyacrylamide (Mw = 14,000,000–18,000,000 % hydrolysis = 8) obtained from American Cyanamid.
[b]TB-41 brine was a produced brine obtained from Tank Battery 41 of North Burbank Oil Field, Shildler, Oklahoma, contained 5% TDS, and had a hardness of 4,300 ppm.

The results shown in Table I indicate that 5,000 ppm solution of this polymer in TB-41 Brine (5% TDS, 4300 ppm hardness) when aged with 3,000 ppm Fe(III) (ferric acetylacetonate) at 120° F., produced a gel within an hour of aging. The gel tightened more with additional aging to a tongue length of 9.3 cm. in 0.86 day. This gel, however, began to break down within 18.2 days of aging and completely disappeared within 48 days leaving a thin solution which can easily be removed.

EXAMPLE II

This example illustrates the gelation of water-soluble polymer, an iron compound and a ketone compound in a produced brine.

The runs were carried out the same as those described in Example I with the exception that ammonium ferric oxalate (400 ppm, final Fe concentration) and varying concentrations of 2,4-pentanedione were used in place of ferric acetylacetonate and the aging was carried out at 77° F. Tongue length measurement of the gels aged at 77° F. is shown in Table II.

TABLE II[a]

Gelation of "OFXC-1163" Polyacrylamide in TB-41 Brine with Ammonium Ferric Oxalate (400 ppm Fe) and Varying Concentrations of 2,4-Pentanedione at 77° F.

| Aging Time | 2,4-Pentanedione (ppm) | | |
|---|---|---|---|
| (Days) | 0 | 753 | 1772 |
| 0.00 | Strong gel | VSG | NG |
| 0.04 | 2.6 | 5.6 | NG |
| 0.15 | 2.5 | 5.4 | NG |
| 0.81 | 2.7 | 4.7 | NG |
| 1.8 | 2.5 | 4.9 | NG |
| 2.1 | 2.7 | 4.9 | NG |
| 5.1 | 2.5 | 5.0 | VSG |
| 19.1 | 2.9 | 5.0 | VSG |
| 35 | 2.5GL + 0.7 H$_2$O | 6.0 | VSG |
| 69 | Gel + H$_2$O | 6.1 | VSG |
| 135 | THIN | THIN | THICK |

NG = No Gel, VSG = Very Slight Gel, GL = Gel Length in centimeters.
[a]See footnotes [a] and [b], Table I.

Table II summarizes the effect of 2,4-pentanedione on gelation of ammonium ferric oxalate as a crosslinker. Notice that a strong gel was immediately produced when ammonium ferric oxalate was mixed with the polymer. However, addition of 753 ppm of 2,4-pentanedione produced a very slight gel which can be pumped into the formation. Both gels degraded within 135 days of aging at room temperature (77° F.).

EXAMPLE III

This example shows the effect of a ketone compound on the gelation of polyacrylamide in a produced brine at 120° F.

The runs were carried out the same as described in Example II except that the concentration of 2,4-pentanedione was 753 ppm and the aging was done at 120° F. as well as 77° F. The results are shown in Table III.

TABLE III[a]

Gelation of "OFXC-1163" Polyacrylamide in TB-41 Brine with Ammonium Ferric Oxalate (400 ppm Fe) and Varying Amounts of 2,4-Pentanedione at 77° F. and 120° F.

| Aging Time | 77° F. Aging 2,4-Pentanedione (ppm) | | 120° F. Aging 2,4-Pentanedione (ppm) | |
|---|---|---|---|---|
| (Days) | 0 | 753 | 0 | 753 |
| 0.00 | Strong gel | VSG to NG | Strong gel | VSG to NG |
| 011 | 1.3 | 5.6 | 2.1 | 6.9 |
| 0.30 | 1.4 | 5.8 | 3.0 | 6.3 |
| 0.96 | 1.3 | 5.8 | 2.8 | 6.8 |
| 1.3 | 1.5 | 5.6 | 2.8 | 7.3 |
| 4.3 | 1.6 | 5.5 | 4.0 | S-PG |
| 18.7 | 2.0 | 5.6 | THIN | NG |
| 34 | 2.5 | 6.4 | THIN | THIN |
| 68 | S-PG | 6.7 | THIN | THIN |
| 134 | THIN | PG | — | — |
| 215 | — | THIN | — | — |

VSG = Very Slight Gel, NG = NO Gel, S-PG = Slight to Partial Gel.
[a]See footnotes [a] and [b], Table I.

Table III indicates that similar behavior to that shown in Table II was observed when 2,4-pentanedione was added to a polymer solution and aged at 120° F. The resulting gels degraded within 19 days of aging producing a thin solution. If this system is used at temperatures higher than 120° F., it is expected that it would degrade even at a faster rate.

EXAMPLE IV

This example demonstrates that the gelation of a gelling composition comprising a water-soluble, an iron compound polymer, and a ketone compound in a produced brine.

All runs shown in Table IV below were carried out the same as those described in Example II except that varying concentrations of 2,4-pentanedione were used. Results are shown in Table IV.

TABLE IV[a]

Gelation of "OFXC-1163" polyacrylamide in TB-41 Brine with Ammonium Ferric Oxalate (400 ppm Fe) and Varying Amounts of 2,4-Pentanedione at 77° F. and 120° F.

| Aging Time | 77° F. Aging 2,4-Pentanedione (ppm) | | | | 120° F. Aging 2,4-Pentanedione (ppm) | | | |
|---|---|---|---|---|---|---|---|---|
| (Days) | 0 | 753 | 1009 | 1267 | 0 | 753 | 1009 | 1267 |
| 0.00 | Strong gel | SG to NG | VSG | VSG | Strong gel | SG to NG | VSG | VSG |
| 011 | 1.8 | 5.3 | 6.3 | 7.1 | 3.2 | 6.2 | 8.2 | PG |
| 018 | 1.9 | 5.0 | 6.1 | 6.3 | 3.2 | 7.1 | 8.0 | PG |
| 0.84 | 1.7 | 4.8 | 5.6 | 6.3 | 3.0 | 6.2 | 7.5 | 9.1 |
| 1.1 | 2.5 | 4.7 | 5.9 | 7.2 | 2.8 | 6.3 | 7.6 | 9.1 |
| 2.2 | 2.2 | 5.1 | 5.8 | 6.2 | 3.0 | 9.1 | 9.3 | 9.3 |
| 3.8 | 2.6 | 4.9 | 5.7 | 6.5 | 3.1 | VSG-SG | VSG-SG | PG |
| 18 | 3.5 | 5.8 | 6.2 | 6.9 | THIN | THIN | THIN | SG |
| 34 | 3.6GL + 0.7 H$_2$O | 6.3 | 6.6 | 6.8 | THIN | THIN | THIN | THIN |
| 68 | Gel + water | 6.6 | 6.9 | 6.8 | — | — | — | — |
| 134 | THIN | VSG | 9.3 | 8.1 | — | — | — | — |

TABLE IV-continued

Gelation of "OFXC-1163" polyacrylamide in TB-41 Brine with Ammonium Ferric Oxalate (400 ppm Fe) and Varying Amounts of 2,4-Pentanedione at 77° F. and 120° F.

| Aging Time | 77° F. Aging 2,4-Pentanedione (ppm) | | | | 120° F. Aging 2,4-Pentanedione (ppm) | | | |
|---|---|---|---|---|---|---|---|---|
| (Days) | 0 | 753 | 1009 | 1267 | 0 | 753 | 1009 | 1267 |
| 215 | — | THIN | VSG | S-PG | — | — | — | — |

NG = No Gel, SG = Slight Gel, VSG-SG = Very Slight Gel to Slight Gel, S-PG — Slight to Partial Gel.
[a] See footnotes [a] and [b] in Table I.

Table 4 shows the results for the addition of 2,4-pentanedione at various levels. Once again, this additive reduced the rate of gelation to a point so that the components of the composition could be simultaneously injected into the well. The resulting gels produced with 0-1267 ppm 2,4-pentanedione disappeared within 18 days of aging at 120° F.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the specification and the claims.

That which is claimed is:

1. A process for wellbore treatment comprising injecting, into an injection or producing well, a composition which comprises an acrylamide-containing polymer, an iron compound, a ketone compound and a liquid.

2. A process according to claim 1 wherein said liquid is a produced brine.

3. A process according to claim 2 wherein the salinity of said produced brine is in the range of from about 1% to about 30% of total dissolved solids.

4. A process according to claim 3 wherein said range is from about 3% to about 27% of total dissolved solids.

5. A process according to claim 4 wherein said range is from 4% to 25% of total dissolved solids.

6. A process according to claim 1 wherein said ketone compound is selected from the group consisting of 2,4-pentanedione, 2,3-pentanedione, and mixtures thereof.

7. A process according to claim 6 wherein said ketone compound is 2,4-pentanedione.

8. A process according to claim 1 wherein the concentration of said ketone compound in said liquid is in the range of from about 25 ppm to about 5,000 ppm.

9. A process according to claim 8 wherein said concentration is in the range of from 100 ppm to 2,000 ppm.

10. A process according to claim 1 wherein said wellbore treatment is selected from the group consisting of water shutoff, gas shutoff, zone abandonment, well workover, fracture treatment, formation profile modification, selective stimulation, and combinations thereof.

11. A process according to claim 1 wherein said acrylamide-containing polymer contains about 0.5 to about 10 mole percent of carboxylate groups.

12. A process according to claim 1 wherein said polymer is partially hydrolyzed polyacrylamide.

13. A process according to claim 1 wherein said iron compound is selected form the group consisting of an organic iron compound, an inorganic iron compound, and combinations thereof.

14. A process according to claim 13 wherein said iron compound is selected from the group consisting of ferric acetylacetonate, ammonium ferric oxalate, ferric acetate, ferric neodecanoate, ferrous acetylacetonate in the presence of an oxidizing agent, ferrous citrate in the presence of an oxidizing agent, ammonium ferric carbonate, ferric ethylacetoacetate, ferric lactate, ferric triethanolamine, ammonium ferric lactate, ferric sulfate, ferric citrate, and combinations thereof.

15. A process according to claim 14 wherein said oxidizing agent is selected from the group consisting of ammonium persulfate, sodium persulfate, potassium persulfate, sodium nitrate, hydrogen peroxide, potassium permanganate, sodium perchlorate, sodium hypochlorite, and mixtures thereof.

16. A process according to claim 13 wherein said iron compound is ferric acetylacetonate.

17. A process according to claim 13 wherein said iron compound is ammonium ferric oxalate.

18. A process according to claim 1 wherein the concentration of said polymer in said liquid is in the range of from bout 100 ppm to about 30,000 ppm.

19. A process according to claim 18 wherein said concentration is in the range of from about 200 ppm to about 10,000 ppm.

20. A process according to claim 1 wherein the concentration of said iron compound in said liquid is in the range of from about 25 ppm to about 15,000 ppm.

21. A process according to claim 20 wherein said concentration is in the range of from 100 ppm to 7,000 ppm.

22. A process according to claim 1 wherein said composition is injected into an oil or gas well in a temperature range of from about 70° F. to about 300° F. and said polymer is selected from the group consisting of copolymers of N-vinyl-2-pyrrolidone and acrylamide, terpolymers of sodium-2-acrylamido-2-methylpropane sulfonate, acrylamide and N-vinyl-2-pyrrolidone, copolymers of sodium-2-acrylamido-2-methylpropanesulfonate and acrylamide, and combinations thereof.

23. A process according to claim 22 wherein said temperature range is from about 150° F. about 250° F.

24. A process according to claim 1 wherein said composition is injected into an oil or gas well in a temperature range of from about 70° F. to about 200° F.

25. A process according to claim 24 wherein said temperature range is from 90° F. to 170° F.

26. A process for near-wellbore treatment comprising injecting a produced brine; polyacrylamide; an iron compound selected from the group consisting of ferric acetylacetonate, ammonium ferric oxalate, and mixtures thereof; and 2,4-pentanedione into a reservoir wherein the concentration of said polyacrylamide in said produced brine is in the range of from 200 ppm to 10,000 ppm; the concentration of said iron compound in said produced brine is in the range of from 100 ppm to 7,000 ppm Fe; the concentration of said 2,4-pentanedione in said produced brine is in the range of from 100 ppm to 2,000 ppm; and said produced brine has a salinity of 4% to 25% total dissolved solids.

* * * * *